Aug. 27, 1963     C. R. ADAMS     3,101,959
BRAKING ARRANGEMENT FOR A TRAILER DOLLY
Filed May 26, 1961     2 Sheets-Sheet 1

INVENTOR.
Charles Ralph Adams
BY
Buckhorn, Cheatham & Blore
ATTORNEYS

Aug. 27, 1963 C. R. ADAMS 3,101,959
BRAKING ARRANGEMENT FOR A TRAILER DOLLY
Filed May 26, 1961 2 Sheets-Sheet 2

INVENTOR.
Charles Ralph Adams
BY
Buckhorn, Cheatham & Blore
ATTORNEYS

United States Patent Office 3,101,959
Patented Aug. 27, 1963

3,101,959
BRAKING ARRANGEMENT FOR A TRAILER DOLLY
Charles Ralph Adams, Ukiah, Calif., assignor to Pierce Trailer & Equipment Company, Portland, Oreg., a corporation of Oregon
Filed May 26, 1961, Ser. No. 112,888
9 Claims. (Cl. 280—432)

This invention relates to tractor-trailer combinations for hauling freight and more particularly to a braking arrangement for a trailer dolly, including a novel automatic brake deactivating means.

Experienced truckers know that extreme hazards involved in driving a tractor, semi-trailer and full trailer combination, known in the trade as "a set of doubles," on slippery pavement because of the tendency of such a rig to jackknife. Experienced truckers also know that because of the multiplicity of uncontrollable pivotal connections involved, such a rig is very difficult if not practically impossible to back up to a loading platform or maneuver in reverse. To reduce the jackknifing tendency under these conditions, a dolly brake may be provided to lock one of the pivotal points against rotation. However, braking at one of the pivotal points may cause serious damage to the dolly drawbar, brake assembly or rear trailer wheels if the trailer should jackknife excessively about another of the pivotal points.

It is therefore, a principal object of my invention to provide a braking arrangement for a trailer dolly, including a brake to prevent relative movement of the dolly about a vertical axis at the connection between the dolly and the supported part of the trailer, but which brake will be released automatically when the trailer jackknifes about the pivotal coupler between the dolly and its leading vehicle beyond predetermined angular limits relative to the leading vehicle.

A further object of the invention is to provide a dolly brake that may be controlled manually from the cab of the towing vehicle, but which will be automatically deactivated in response to the sideways movement of the dolly drawbar beyond predetermined angular limits relative to its leading vehicle.

A further object is to provide a novel hand brake of simplified construction to prevent relative rotation between trailer dolly and trailer.

Other objects and advantages of my invention will appear in the following detailed description described with reference to the drawings in which.

Figure 1:
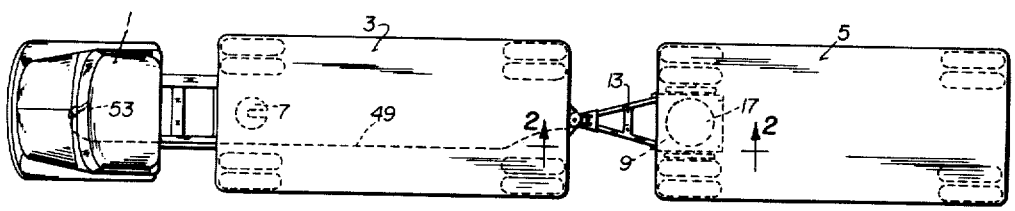
FIG. 1 is a top plan view of a tractor, semi-trailer, and full trailer combination embodying the elements of my invention.

Referring to the drawings, FIG. 1 shows a tractor 1, semi-trailer 3 and full trailer 5 combination for which the device of my invention is especially suited, although it is to be understood that my invention has utility in any tractor-trailer combination having two or more pivotal connections, such as in a truck and full trailer. The semi-trailer is pivotally connected to the tractor by a standard fifth wheel connection 7 and together they form the leading vehicle. The trailer dolly 9 connects the leading vehicle to a trailing vehicle or rear trailer 5 by means of the drawbar 13. The steerable trailer dolly, which supports the front end of the rear trailer, comprises a rectangular dolly frame 11 (FIG. 5), including longitudinal channels 12 and transverse channels 14, the drawbar 13 pivotally mounted to the forward ends of the channels 12 and a front axle 15 mounted by means of leaf springs 16 on the frame. The forward end of the drawbar is coupled to the leading vehicle by the conventional coupler 29, which provides for pivotal movement of the drawbar about the vertical axis 28 at the rear end of the leading vehicle.

The dolly trailer rotatable connection 17 is one of several types well known in the art, others of which include a kingpin type, and a standard fifth wheel. All of the various rotatable dolly connections provide for relative movement of the dolly about a vertical axis at the forward end of the rear trailer and may be adapted for use with my invention with only slight obvious modifications of the brake from the specific embodiment I have shown. The rotatable connection illustrated is essentially a frictionless roller bearing connection having a hollow circular lower bearing race 19 (FIG. 6) supported by the dolly frame 11, including both the longitudinal and transverse channels, and adapted to receive a corresponding depending circular upper bearing race 21 between which roller bearings 25 are interposed. The upper bearing race 21 is mounted on a circular plate 22, which is mounted beneath a rectangular frame formed by channels 23 affixed to a plate 24 on the underside of the rear trailer channels 30 which support the trailer bed 32. A depending circular drum 26 is welded to the trailer plate 24 and to the circular plate 22 and serves as a brake drum in a manner to be described below.

From the foregoing it is obvious that the dolly connecting the trailer to the leading vehicle is pivotal about two points, namely, about the vertical axis 28 of the drawbar coupler at the rear end of the leading vehicle and also about the vertical axis 27 at the dolly's rotatable connection with the supported portion of the trailing vehicle. Such an arrangement provides two points at which jackknifing may take place while the rig is traveling in either a forward or a reverse direction. By providing braking means at one of the pivotal points, namely at the rotatable connection 17, I eliminate the possibility of jackknifing at this point by preventing rotation of the dolly relative to the trailing vehicle. However, automatic brake deactivating means are provided as an important part of the braking arrangement, to prevent possible drawbar, wheel or brake damage should severe jackknifing occur at the forward vertical axis 28 while the dolly is braked. The deactivating means are actuated in response to movement beyond predetermined limits of the drawbar about the forward vertical axis 28 to automatically release the brake and allow movement about the rear vertical axis 27.

Figure 5:
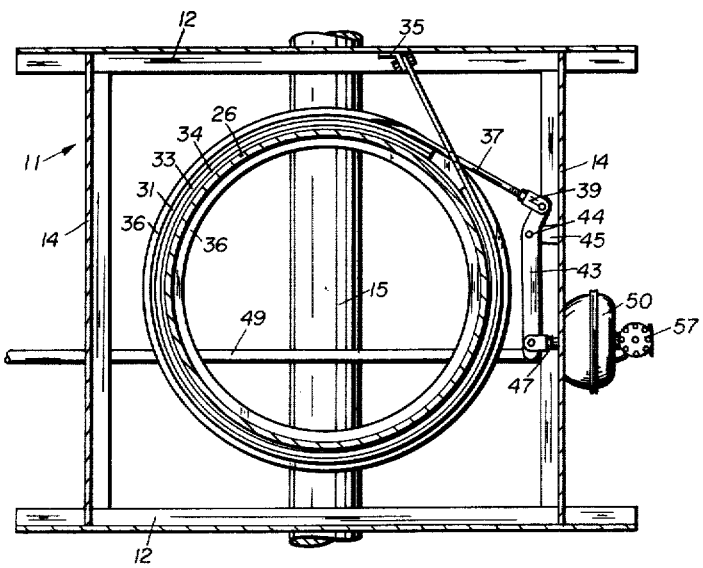
FIG. 5 is an enlarged sectional view of the dolly brake of my invention taken along the line 5—5 of FIG. 2.
Figure 6:
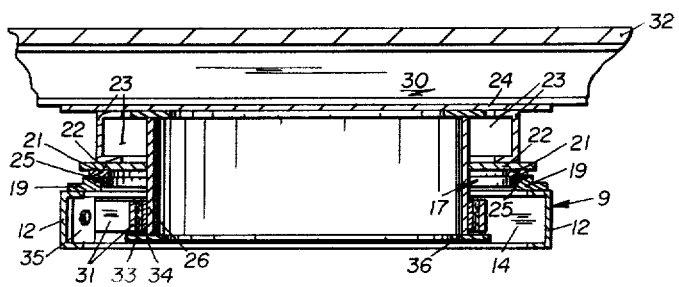
FIG. 6 is an enlarged sectional elevation of the dolly brake taken along the lines 6—6 of FIG. 2.

The braking means of my invention includes a friction brake on the trailer dolly adapted to frictionally engage the rear trailer or at least a depending portion thereof and a fluid pressure braking system whereby the friction brake may be energized manually from the cab of the towing vehicle. The brake band 31 (FIGS. 5 and 6) having a brake lining 33 on its inner surface is adapted to encircle the lower portion of the depending brake drum 26. A reinforcing strip 34 on the drum is aligned with the lining and a retaining ring 36 is welded to the bottom of the drum to maintain the brake band in position. One end of the brake band is anchored to the longitudinal channel 12, such as by the bracket 35 (FIGS. 5 and 6).

The other end of the brake band is secured to a circular threaded shank 37 which is threaded into one end of a female connecting member 39. The opposite end of the connecting member 39 is pivotally connected to the short arm end of the lever member 43 which is pivoted at 44 intermediate its two ends to the support 45 which is secured to the dolly frame. The long arm of the lever member 43 is pivotally connected to the outer end of the actuating rod 47 of the conventional power means 50, which is bolted to the cross channel 14 of the dolly frame. When the power means is energized the actuating rod will force the long arm of the lever 43 toward the drum causing the short arm to rotate away from the drum, which will pull the brake band tight until the brake lining frictionally engages the outer surface of the reinforcing strip 34 on the drum. Although the band brake described is of a simplified construction, it will be obvious that other types of friction brakes may be used in lieu thereof, such as internal brake shoes, braking clamps, or jaws, depending on which is most readily adaptable to the type of rotatable dolly connection used.

I provide an air pressure braking system, although any fluid system could be used, to energize the brake upon actuation of a remote control valve. The flexible hose 49 of the system transmits pressure to the power means 50 from the remote manually operated valve 53 (FIG. 1) in the cab of the towing vehicle. Hose quick couplers (not shown) may be provided at the various vehicle connections to facilitate coupling operations. The cab valve 53 is a standard metering type or selective hand valve which enables the truck driver to apply the brake at variable pressures. The valve preferably has a pressure gauge connected thereto to enable the driver to apply whatever braking pressure may be desirable under a given set of circumstances. For example, the operator may wish to apply very slight amount of drag to the rear trailer dolly to eliminate side sway while traveling in a forward direction. An auxiliary foot valve also may be provided in conjunction with the wheel brake pedal so as to be applied simultaneously with the trailer wheel brakes, or preferably a split second sooner as an added safety measure for highway driving.

The automatic brake deactivating means of my invention is adapted to deenergize the fluid pressure system and the manual control valve when the drawbar jackknifes about the vertical axis 28. The deactivating means includes primarily a control means on the leading vehicle and a sensing means at the coupler between the drawbar and the rear end of the leading vehicle.

The control means comprises a first conventional air relay valve 55 connected in the hose 49 between the manual cab valve and the brake, which will prevent the transmission of pressure from the cab valve to the brake upon being energized. The relay valve is actuated or energized by fluid pressure transmitted to it through the branch pressure hose 59 upon actuation of the sensing means at the drawbar.

The sensing means comprises primarily two cooperative elements, one on the forward end of the drawbar and the other on the rear end of the leading vehicle and an associated second valve means. These cooperative elements include a limit probe, and a limit defining means, which are adapted to cooperate only when the drawbar exceeds its predetermined limit of movement.

Figure 2:
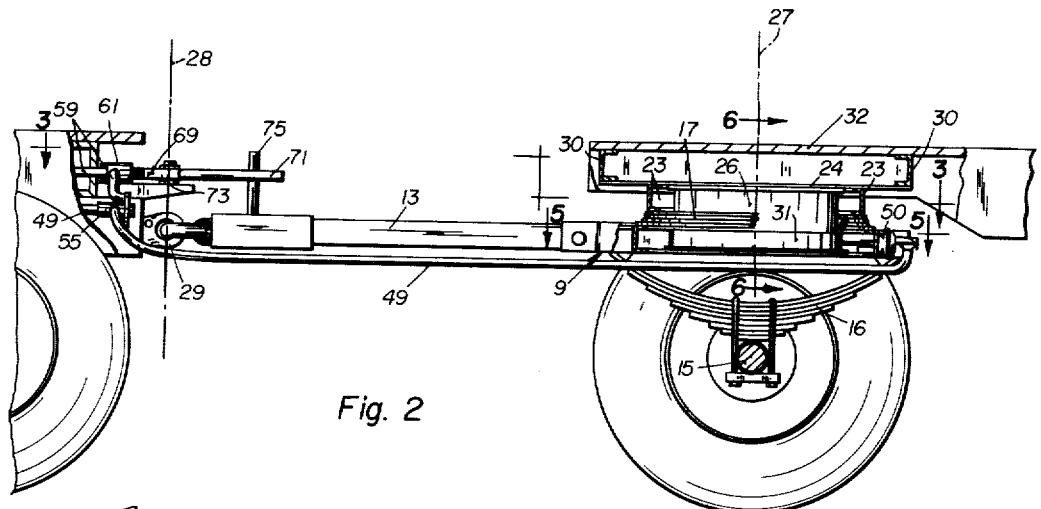
FIG. 2 is an enlarged fragmentary side elevation of the combination on line 2—2 of FIG. 1, showing in detail a trailer dolly embodying my invention.
Figure 3:
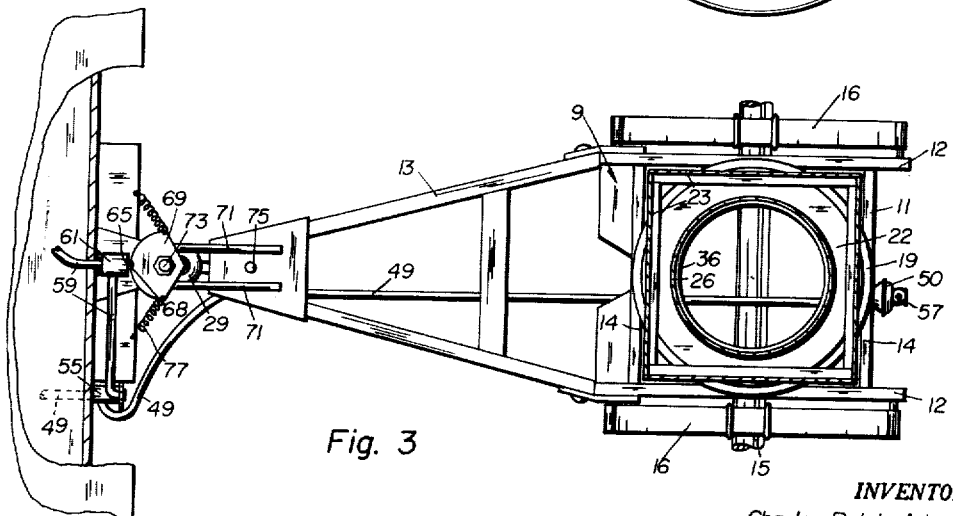
FIG. 3 is an enlarged fragmentary top plan view of the braking arrangement taken along the line 3—3 of FIG. 2.

The vertical rod 75 (FIG. 2) rigidly attached to the forward end of the drawbar serves as the limit probe. The limit defining means provided are two horizontal arms 71 rigidly attached to and extending rearwardly from the rotatable cam plate 69. The cam plate is rotatably mounted by means of the pin 73 to the rear end of the leading vehicle. The rod extends upward equally between the two extension arms when the drawbar is aligned with the longitudinal axis of the leading vehicle (FIG. 3). An arcuate recessed forward edge portion 68 of the cam plate 69 abuts the second valve means, a conventional poppet valve 61, having a plunger 65, the outer end of which abuts the forward edge of the cam plate. This valve serves as the relay valve actuating means and is normally closed to prevent transmission of fluid pressure from a source (not shown) on the leading vehicle to the relay valve 55 through the hose 59.

Figure 4:
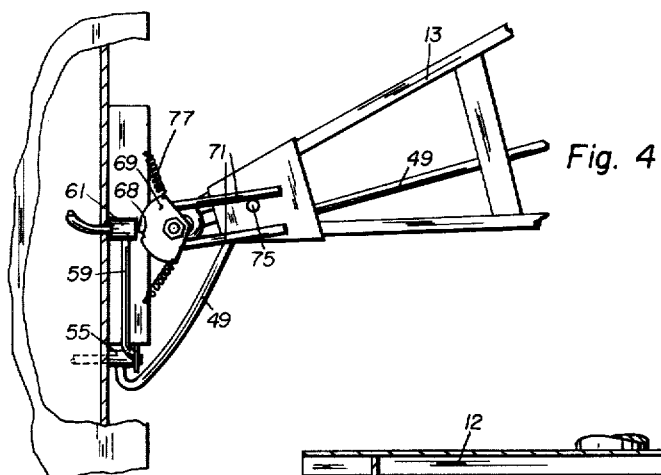
FIG. 4 is an enlarged fragmentary top plan view of the brake deactivating means in its actuated position.

Energization of the relay valve occurs when the plunger 65 of the poppet valve is depressed by the cam plate rotated in response to the force of the rod 75 pushing against one of the cam plate extension arms (FIG. 4). The rod will move an extension arm when the forward end of the drawbar rotates about the vertical axis 28 beyond predetermined angular limits relative to the longitudinal axis of the leading vehicle. This action opens the poppet valve and transmits pressure to the relay valve, which closes the hose 49 to pressure from the cab valve, which in turn reduces pressure in the hose 49 between the relay valve and the brake. This pressure drop will cause the friction brake to disengage the drum 26. The standard quick release air valve 57 at the power cylinder inlet port is provided to exhaust air quickly from the hose 49 at the power cylinder when the pressure drop occurs, which provides instantaneous release of the brake.

Spring means 77 are provided between the cam plate and the rear end of trailer to return the cam plate to its original position when the angle of the drawbar is corrected so as to be within its predetermined angular limits with respect to the axis of the semi-trailer. Once the drawbar angle is corrected the friction brake will again engage the drum provided the cab valve is still actuated. The predetermined angular limits are such that the dolly brake will be released before any damage occurs to the drawbar, trailer wheels, or dolly brake, due to the sliding of the front wheels of the rear trailer laterally over the road surface.

It is obvious from the foregoing description of the specific sensing means that other means could be provided in lieu thereof, such as a cam mounted directly to the forward end of the drawbar. This would eliminate the cam springs and the necessity for making the cam plate independently rotatable. It should also be obvious that the exact location of the poppet valve is not controlling, and that even two separate poppet valves could be arranged in conjunction with the direct coupler at the drawbar whereby projections from either side of the forward end of the drawbar would engage one of the poppet valves located on either side of the coupler 29 when the drawbar reached its predetermined limits of movement.

Thus I have provided a dolly braking arrangement that may be selectively applied by the truck driver only within the safe drawbar limits and which will be released in any event when the dolly is at a dangerous jackknifing angle with respect to its leading vehicle.

While I have described my invention with reference to certain preferred embodiments it is understood that I do not intend to limit my invention to the specific embodiments shown and described, but that the limits thereof are to be determined by the scope of the following claims.

I claim:

1. Deactivating means for a trailer dolly brake, said brake being at the rotatable connection between a dolly and trailer and being adapted to prevent relative rotation between said trailer dolly and said trailer, said trailer dolly including a drawbar and a coupler for pivotally connecting said drawbar to a leading vehicle, said leading vehicle including a first manual control means for applying and releasing said brake and connecting means operatively connecting said first control means and said brake;

said deactivating means including a second control means effectively interposed between said first control means and said brake for deenergizing said first control means and thereby releasing said brake upon actauting thereof; and sensing means, including cooperative elements mounted on said drawbar and said vehicle adjacent said coupler, responsive to movement of said drawbar beyond predetermined angular limits relative to said leading vehicle for effecting actuation of said second control means.

2. Deactivating means for a trailer dolly brake, said brake being at the rotatable connection between a dolly and trailer and being adapted to prevent relative rotation between said trailer dolly and said trailer, said trailer dolly including a drawbar and a coupler for pivotally connecting said drawbar to a leading vehicle, said leading vehicle including a first manual control means for said brake, and a fluid pressure system for energizing said brake in response to actuation of said first control means;

said deactivating means including a second control means for effecting release of said brake;

said second control means comprising a first valve means interconnected in said fluid pressure system between said first control means and said brake for deenergizing said brake upon actuation thereof;

a branch pressure line interconnected in said fluid pressure system for transmitting fluid pressure to said first valve means;

sensing means including a second valve means in said branch pressure line, mounted adjacent said coupler and responsive to movement of said drawbar beyond predetermined angular limits relative to said leading vehicle for effecting actuation of said first valve means.

3. Deactivating means for a trailer dolly brake, said brake being at the rotatable connection between a dolly and trailer and being adapted to prevent relative rotation between said trailer dolly and said trailer, said trailer dolly including a drawbar and a coupler for pivotally connecting said drawbar to a leading vehicle, said leading vehicle including a first control means for said brake;

said deactivating means including a second control means effectively interposed between said first control means and said brake for effecting release of said brake upon actuation thereof;

sensing means mounted adjacent said coupler responsive to movement of said drawbar beyond predetermined angular limits relative to said leading vehicle for effecting actuation of said second control means;

said sensing means including two cooperative elements, one of said elements being mounted on said drawbar and the other being mounted on said leading vehicle;

whereby said elements will effectively cooperate to actuate said second control means when said drawbar exceeds said predetermined angular limits.

4. Deactivating means for a trailer dolly brake, said brake being at the rotatable connection between a dolly and trailer and being adapted to prevent relative rotation between said trailer dolly and a trailer, said trailer dolly including a drawbar and a coupler for pivotally connecting said drawbar to a leading vehicle, said leading vehicle including a first control means for said brake;

said deactivating means including a second control means effectively interposed between said first control means and said brake for deenergizing said brake upon actuation thereof;

sensing means mounted adjacent said coupler responsive to movement of said drawbar beyond predetermined angular limits relative to said leading vehicle for effecting actuation of said second control means;

said sensing means including limit defining means on said leading vehicle; and a limit probe on the forward end of said drawbar;

said limit probe being relatively movable with respect to said limit defining means within said predetermined limits;

whereby a movement of said drawbar beyond said predetermined angular limits will cause cooperative engagement of said limit defining means and said limit probe to effect actuation of said second control means.

5. Deactivating means for a trailer dolly brake, said brake being at the rotatable connection between a dolly and trailer and being adapted to prevent relative rotation between a trailer dolly and its trailer, said trailer dolly including a drawbar and a coupler for pivotally connecting said drawbar to a leading vehicle, said leading vehicle including a first control means for said brake;

said deactivating means including a second control means effectively interposed between said first control means and said brake for deenergizing said brake upon actuation thereof;

sensing means mounted adjacent said coupler responsive to movement of said drawbar beyond predetermined angular limits relative to said leading vehicle for effecting actuation of said second control means;

said sensing means including two cooperative elements, one of said elements being mounted on said leading vehicle and the other being mounted on said drawbar;

actuating means responsive to movement of said cooperative elements beyond said predetermined limits;

whereby said actuating means will actuate said second control means.

6. Deactivating means for use with a trailer dolly brake, said brake being at the rotatable connection between a dolly and trailer and adapted to prevent relative rotation between a trailer dolly and its connected trailer, said trailer dolly including a drawbar and a coupler for pivotally connecting said drawbar to a leading vehicle, said leading vehicle including a first control means for said brake, and a fluid pressure system for energizing said brake in response to actuation of said first control means;

said deactivating means including a second control means effectively interposed between said first control means and said brake for deenergizing said brake upon energization thereof;

sensing means mounted adjacent said coupler responsive to movement of said drawbar beyond predetermined angular limits relative to said leading vehicle;

said sensing means including limit defining means on said leading vehicle;

a limit probe on said drawbar adapted to cooperatively engage said limit defining means when said drawbar exceeds said predetermined limits of movement; and valve means actuated by cooperative engagement of said limit defining means and said limit probe, whereupon said valve means will energize said second control means.

7. In a trailer dolly braking arrangement for preventing relative rotation at the rotatable connection between a trailer dolly and a trailing vehicle, said dolly having a drawbar freely movable at its forward end about a first vertical axis at the rear end of a leading vehicle, and said dolly also being freely movable about a second vertical axis at the front end of the said trailing vehicle;

an arrangement comprising;

braking means on said dolly to selectively prevent rotation of said dolly and said trailing vehicle about said second vertical axis; and deactivating means, including control means on said leading vehicle; and sensing means including two cooperative elements, one being on said drawbar, the other being on said leading vehicle, adapted to cooperate in actuation of said control means when said drawbar exceeds predetermined angular limits with respect to said leading vehicle.

8. In a trailer dolly braking arrangement for a tractor-trailer combination including a loading vehicle and a trailing vehicle connected by a trailer dolly, said dolly having a drawbar freely movable at its forward end about a first vertical axis at the rear end of said leading vehicle, and said dolly also being freely movable about a second vertical axis at the front end of said trailing vehicle;

said arrangement comprising;

braking means to selectively prevent rotation of said dolly about said second vertical axis;

said braking means including a dolly brake on said dolly;

and first control means on said leading vehicle to manually energize said brake;

deactivating means, including a second control means effectively interposed between said first control means and said brake for automatically effecting release of said brake;

said deactivating means also including sensing means responsive to movement of said drawbar beyond predetermined angular limits relative to said leading vehicle about said first vertical axis for effecting actuation of said second control means;

said sensing means including two cooperative elements, one being on said drawbar, the other being on said leading vehicle, adapted to cooperate in actuation of said second control means when said drawbar exceeds said predetermined limits.

9. In a trailer dolly braking arrangement for a tractor-trailer combination including a leading vehicle and a trailing vehicle connected by a trailer dolly, said dolly having a drawbar freely movable about a first vertical axis at the rear end of said leading vehicle, said dolly also being freely movable about a second vertical axis at the front end of said trailing vehicle;

said arrangement comprising;

braking means to selectively prevent rotation of said dolly about said second vertical axis;

said braking means including a brake band attached to said dolly and a brake drum depending from said trailing vehicle;

said brake band having one end anchored to said dolly and adapted to encircle said brake drum;

power means mounted on said dolly for actuating said brake band; and means connecting said power means to the opposite end of said brake band;

whereby the actuation of said power means will cause the inner surface of said brake band to frictionally engage the outer surface of the depending portion of said trailer, thereby preventing rotation of said dolly about said second vertical axis; and deactivating means, including control means on said leading vehicle and sensing means on said drawbar for automatically releasing said brake in response to movement of said drawbar about said first vertical axis beyond predetermined angular limits relative to said leading vehicle.

References Cited in the file of this patent
UNITED STATES PATENTS

| | | |
|---|---|---|
| 1,078,801 | Munsing | Nov. 18, 1913 |
| 1,179,793 | Barber | Apr. 18, 1916 |
| 1,374,352 | Borst | Apr. 12, 1921 |
| 2,692,145 | Hammond | Oct. 19, 1954 |
| 2,838,323 | Coustillac | June 10, 1958 |

UNITED STATES PATENT OFFICE
CERTIFICATE OF CORRECTION

Patent No. 3,101,959                          August 27, 1963

Charles Ralph Adams

It is hereby certified that error appears in the above numbered patent requiring correction and that the said Letters Patent should read as corrected below.

Column 1, line 14, for "that" read -- the --; line 44, for "hand" read -- band --; column 4, line 73, for "actauting" read -- actuation --; column 6, line 69, for "loading" read -- leading --.

Signed and sealed this 25th day of February 1964.

(SEAL)
Attest:
ERNEST W. SWIDER                          EDWIN L. REYNOLDS

Attesting Officer                          Acting Commissioner of Patents